(12) United States Patent
Tsuneki et al.

(10) Patent No.: US 10,924,039 B2
(45) Date of Patent: Feb. 16, 2021

(54) MOTOR CONTROL DEVICE AND CONTROL METHOD FOR MOTOR CONTROL DEVICE

(71) Applicant: FANUC CORPORATION, Yamanashi (JP)

(72) Inventors: Ryoutarou Tsuneki, Yamanashi-ken (JP); Satoshi Ikai, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 21 days.

(21) Appl. No.: 16/357,829

(22) Filed: Mar. 19, 2019

(65) Prior Publication Data

US 2019/0296662 A1 Sep. 26, 2019

(30) Foreign Application Priority Data

Mar. 23, 2018 (JP) .............................. JP2018-055669

(51) Int. Cl.
*H02P 3/06* (2006.01)
*H02P 3/04* (2006.01)

(52) U.S. Cl.
CPC . *H02P 3/06* (2013.01); *H02P 3/04* (2013.01)

(58) Field of Classification Search
CPC combination set(s) only.
See application file for complete search history.

(56) References Cited

U.S. PATENT DOCUMENTS 6,397,971 B1* 6/2002 Kifuku ................. B62D 5/0484
180/443
2006/0022624 A1 2/2006 Ushiyama et al.
(Continued)

FOREIGN PATENT DOCUMENTS

JP 2005130673 A 5/2005
JP 2005199314 A 7/2005
(Continued)

OTHER PUBLICATIONS

Notice of Reasons for Refusal issued by the Japanese Patent Office in relation to Japanese Application No. 2018-055669 dated Feb. 25, 2020 (2 pages) along with English language translation (2 pages).
(Continued)

*Primary Examiner* — Jorge L Carrasquillo
(74) *Attorney, Agent, or Firm* — Robert P. Michal, Esq.; Carter, DeLuca & Farrell LLP

(57) ABSTRACT

A motor control device for controlling a servomotor to axially move a movement target object includes: a speed detector for detecting the movement speed of the movement target object; an abnormality detector for detecting an abnormality of the speed detector; a motor controller for performing deceleration control on the servomotor to decelerate the movement target object, upon detection of the abnormality; a reference speed generator for generating a reference speed that decreases with passage of time, based on the movement speed when the movement target object decelerates and a predetermined deceleration; a speed monitor for monitoring the movement speed and determining whether or not the movement speed is equal to or greater than the reference speed; and a brake controller for actuating a brake for braking axial movement of the movement target object when the movement speed is determined to be equal to or greater than the reference speed.

9 Claims, 9 Drawing Sheets

(56) References Cited

U.S. PATENT DOCUMENTS

| | | | |
|---|---|---|---|
| 2011/0257785 A1* | 10/2011 | Nihei | B25J 9/1674 |
| | | | 700/254 |
| 2016/0251794 A1* | 9/2016 | Kim | D06F 37/304 |
| | | | 8/137 |
| 2019/0036467 A1* | 1/2019 | Hashimoto | H02P 21/09 |
| 2019/0383387 A1* | 12/2019 | Kamio | F16H 61/32 |

FOREIGN PATENT DOCUMENTS

| | | | |
|---|---|---|---|
| JP | 2006-50682 A | | 2/2006 |
| JP | 2011067017 A | * | 3/2011 |
| JP | 2011067017 A | | 3/2011 |
| WO | 2012043116 A1 | | 4/2012 |
| WO | 2015137040 A1 | | 9/2015 |

OTHER PUBLICATIONS

Decision to Grant a Patent issued by the Japanese Patent Office in relation to Japanese Application No. 2018-055669 dated Mar. 31, 2020 (3 pages) along with English language translation (2 pages).

* cited by examiner

US 10,924,039 B2

MOTOR CONTROL DEVICE AND CONTROL METHOD FOR MOTOR CONTROL DEVICE

CROSS-REFERENCE TO RELATED APPLICATION

This application is based upon and claims the benefit of priority from Japanese Patent Application No. 2018-055669 filed on Mar. 23, 2018, the contents of which are incorporated herein by reference.

BACKGROUND OF THE INVENTION

Field of the Invention

The present invention relates to a motor control device for controlling a servomotor for axially moving a movement target object, and a control method for the motor control device.

Description of the Related Art

Japanese Laid-Open Patent Publication No. 2006-050682 discloses that a power breaker is caused to forcibly shut off supply of electric power to a motor if a determiner judges the motor speed is abnormal when a control unit performs a decelerating operation for decelerating the motor by controlling a servo amplifier.

SUMMARY OF THE INVENTION

In the technique described in Japanese Laid-Open Patent Publication No. 2006-050682, when the determiner judges that the motor speed is abnormal, the power breaker forcibly shuts off supply of electric power to the motor. As a result, there occurs a problem that the motor continues to rotate due to inertia after the power shutdown, to thereby elongate the movement distance from the shutdown to complete stop of the motor.

The present invention has been devised to solve the above problem, and it is therefore an object of the present invention to provide a motor control device and a control method in the motor control device which can shorten the movement distance that the movement target object will move until the stop of the servomotor.

A first aspect of the present invention resides in a motor control device for controlling a servomotor so as to axially move a movement target object, which includes: a speed detector configured to detect a movement speed of the movement target object; an abnormality detector configured to detect an abnormality of the speed detector; a motor controller configured to perform deceleration control on the servomotor to decelerate the movement target object, upon detection of the abnormality; a reference speed generator configured to generate a reference speed that decreases with passage of time, based on the movement speed when the movement target object decelerates and a predetermined deceleration; a speed monitor configured to monitor the movement speed and determine whether or not the movement speed is equal to or greater than the reference speed; and a brake controller configured to actuate a brake for braking axial movement of the movement target object, when the movement speed is determined to be equal to or greater than the reference speed.

A second aspect of the present invention resides in a control method for a motor control device that controls a servomotor so as to axially move a movement target object, the motor control device includes a speed detector configured to detect a movement speed of the movement target object, and the control method includes: a speed detecting step of detecting the movement speed of the movement target object by the speed detector; an abnormality detecting step of detecting an abnormality of the speed detector; a motor controlling step of performing deceleration control on the servomotor to decelerate the movement target object upon detection of the abnormality; a reference speed generating step of generating a reference speed that decreases with passage of time, based on the movement speed when the movement target object decelerates and a predetermined deceleration; a speed monitoring step of monitoring the movement speed and determining whether or not the movement speed is equal to or greater than the reference speed; and a brake controlling step of actuating a brake for braking axial movement of the movement target object, when the movement speed is determined to be equal to or greater than the reference speed.

According to the present invention, it is possible to shorten the movement distance that the movement target object will move until the servomotor stops.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Motor Control Device]

Figure 1:
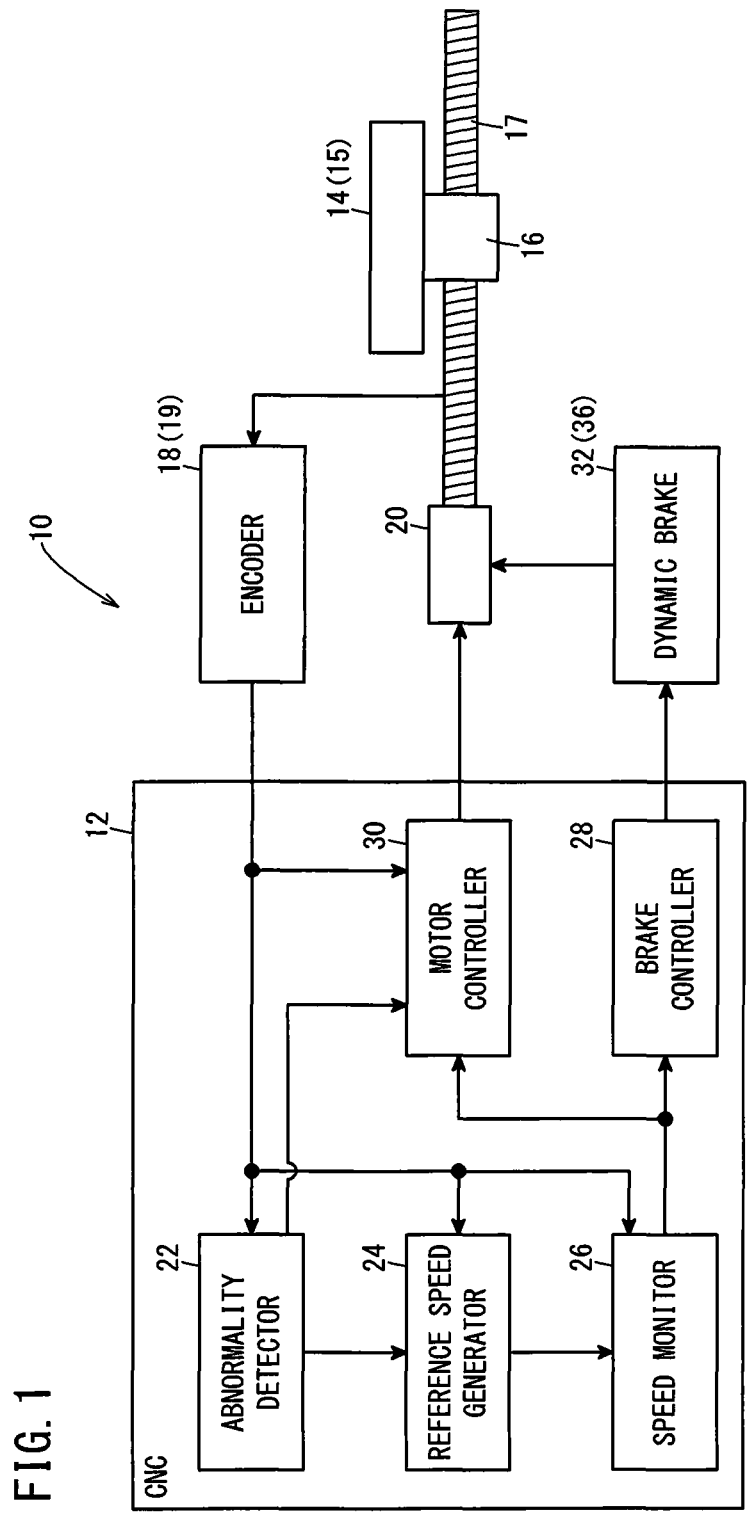
FIG. 1 is a block diagram showing a configuration of a motor control device.

A motor control device 10 according to the present embodiment includes a CNC (computer numerical controller) 12 for controlling a machine tool and an encoder 18 for detecting the movement speed of a worktable 14. The CNC 12 controls a servomotor 20 for axially moving the worktable 14. A ball screw nut 16 is fixed on the worktable 14. As the servomotor 20 turns a ball screw shaft 17, the worktable 14 is axially moved together with the ball screw nut 16. Although the encoder 18 directly detects the rotational speed of the ball screw shaft 17, it is possible to determine the movement speed of the worktable 14 from the rotational speed of the ball screw shaft 17. The worktable 14 serves as a movement target object 15, and the encoder 18 serves as a speed detector 19.

FIG. 1 is a block diagram showing a configuration of the motor control device 10. The CNC 12 includes an abnormality detector 22, a reference speed generator 24, a speed monitor 26, a brake controller 28 and a motor controller 30. It is to be noted that the abnormality detector 22, the reference speed generator 24, the speed monitor 26, the brake controller 28 and the motor controller 30 are provided in the servo amplifier, and the servo amplifier and the encoder 18 constitute the motor control device 10.

The abnormality detector 22 detects an abnormality of the encoder 18. The abnormality of the encoder 18 means a state in which it cannot be guaranteed that the movement speed of the worktable 14 detected by the encoder 18 falls within a specified error range of the actual movement speed of the worktable 14, due to, for example, breakage of part of the slits of an incremental encoder. Even if a temporary abnormality has occurred in the encoder 18, the encoder may be restored to a normal state to detect the movement speed of the worktable 14 correctly.

When an abnormality of the encoder 18 is detected by the abnormality detector 22, the reference speed generator 24 generates a reference speed that decreases with time based on a predetermined deceleration. The reference speed will be described in detail later. The speed monitor 26 monitors whether or not the absolute value of the movement speed of the worktable 14 detected by the encoder 18 is equal to or greater than the reference speed.

When the speed monitor 26 determines that the absolute value of the movement speed of the worktable 14 detected by the encoder 18 is equal to or greater than the reference speed, the brake controller 28 activates a dynamic brake 32 so as to brake the axial movement of the worktable 14. The dynamic brake 32 serves as a brake 36.

The motor controller 30 controls electric power to be supplied to the servomotor 20, based on a command speed which is a command value of the movement speed of the worktable 14 and the movement speed of the worktable 14 detected by the encoder 18. Further, when an abnormality of the encoder 18 is detected by the abnormality detector 22, the motor controller 30 performs deceleration control of the servomotor 20 to decelerate the axial movement of the worktable 14 and stop it. Further, when the speed monitor 26 determines that the absolute value of the movement speed of the worktable 14 detected by the encoder 18 is equal to or greater than the reference speed, the motor controller 30 stops deceleration control of the servomotor 20.

[Worktable Stop Control Process]

Figure 2:
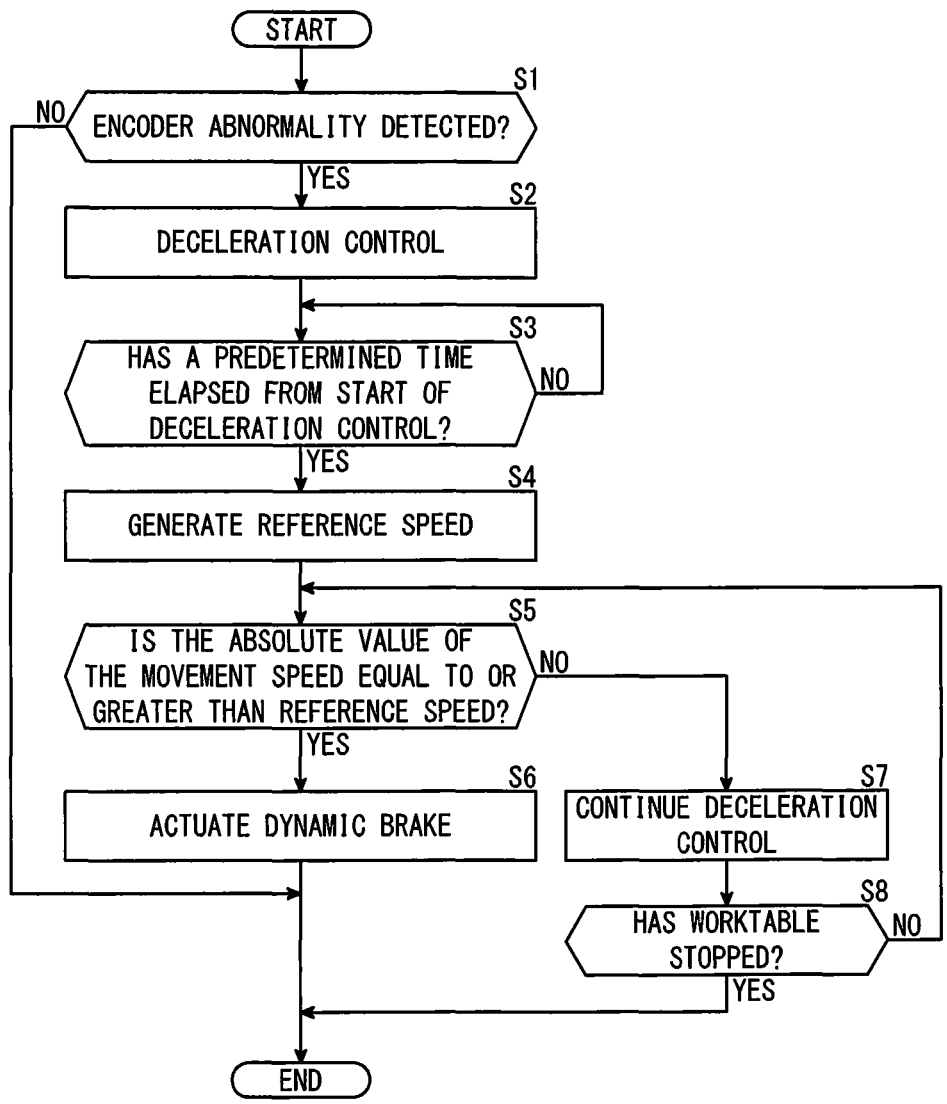
FIG. 2 is a flowchart showing a flow of how a motor control device performs a stop control process on a movement target object.

In the motor control device 10 of the present embodiment, when an abnormality occurs in the encoder 18, stop control is performed to stop the axial movement of the worktable 14. FIG. 2 is a flowchart showing a flow of how the motor control device 10 performs a stop control process of the movement target object 15.

At step S1, the abnormality detector 22 determines whether or not an abnormality of the encoder 18 is detected. When an abnormality of the encoder 18 is detected, the process proceeds to step S2. When no error of the encoder 18 is detected, the process is terminated. Abnormality of the encoder 18 can be determined as follows, for example. That is, two encoders 18 for detecting the movement speed and position of the worktable 14 are provided, and when the difference between the movement speeds of the worktable 14 output from the two encoders 18 is equal to or greater than a predetermined speed difference, or when the deviation between the positions of the worktable 14 output from the two encoders 18 becomes equal to or greater than a predetermined deviation, it can be determined that there is an abnormality of the encoder 18. The method of finding an abnormality of the encoder 18 is not limited to the above method.

At step S2, the motor controller 30 performs deceleration control to decelerate the servomotor 20 based on the movement speed of the worktable 14 detected by the encoder 18, and the process proceeds to step S3.

At step S3, the reference speed generator 24 determines whether or not a predetermined time has elapsed since the motor controller 30 started deceleration control of the servomotor 20. When a predetermined time has elapsed since the start of deceleration control of the servomotor 20, the process proceeds to step S4. When the predetermined time has not elapsed since the start of deceleration control of the servomotor 20, the procedure at step S3 is repeated.

At step S4, the reference speed generator 24 generates a reference speed and the process proceeds to step S5. The reference speed generator 24 generates a reference speed that lowers with the passage of time, based on the movement speed of the worktable 14 detected by the encoder 18 when the predetermined time has elapsed since the motor controller 30 started the deceleration control of the servomotor 20 and a predetermined deceleration.

At step S5, the speed monitor 26 determines whether or not the absolute value of the movement speed of the worktable 14 detected by the encoder 18 is equal to or greater than the reference speed. When the absolute value of the movement speed of the worktable 14 is equal to or greater than the reference speed, the process proceeds to step S6. When the absolute value of the movement speed of the worktable 14 is less than the reference speed, the process goes to step S7.

At step S6, the brake controller 28 outputs an operation command for actuating the dynamic brake 32 to the dynamic brake 32, and ends the process. At this time, the motor controller 30 stops deceleration control of the servomotor 20.

At step S7 following the negative decision at step S5, the motor controller 30 continues the deceleration control of the servomotor 20, and the process proceeds to step S8. At this time, the brake controller 28 does not output an operation command to the dynamic brake 32.

At step S8, the motor controller 30, based on the movement speed of the worktable 14 detected by the encoder 18, determines whether or not the worktable 14 has stopped. When the worktable 14 has stopped, the process is ended. When the worktable 14 is not stopped, the process returns to the step S5.

Figure 3:
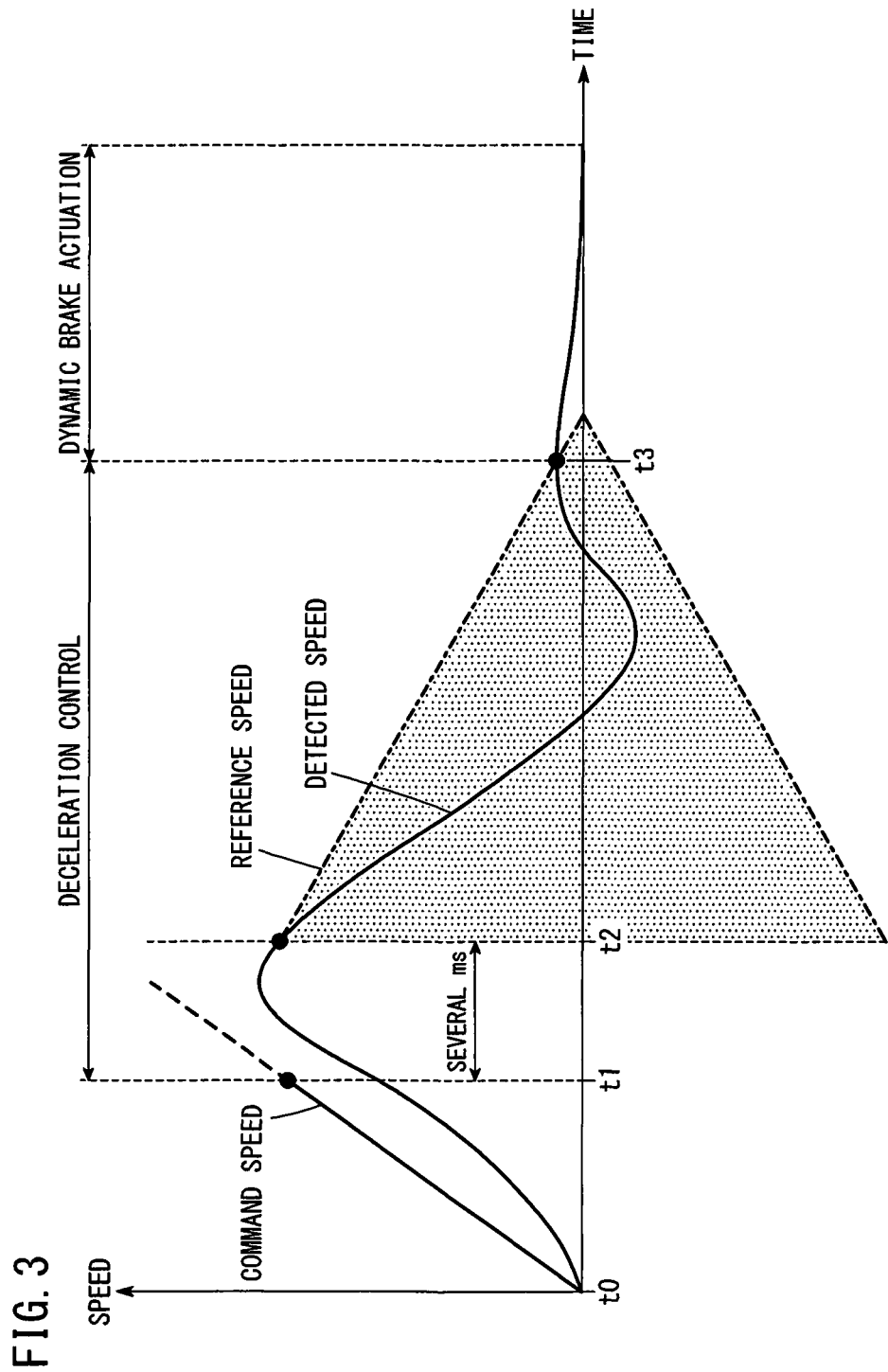
FIG. 3 is a time chart showing the movement speed of a worktable detected by an encoder when a stop control of the worktable is performed in a motor control device.

FIG. 3 is a time chart showing the movement speed (indicated as detected speed in FIG. 3) of the worktable 14 detected by the encoder 18 when a stop control of the worktable 14 is performed in the motor control device 10. From time t0 to time t1, the motor controller 30 controls the servomotor 20 so that the movement speed of the worktable 14 becomes equal to the command speed, based on the movement speed of the worktable 14 detected by the encoder 18.

At time t1, the abnormality detector 22 detects an abnormality of the encoder 18 (step S1: YES). After time t1, the motor controller 30 performs deceleration control of the servomotor 20 based on the movement speed of the worktable 14 detected by the encoder 18 (step S2).

At time t2 after a lapse of a predetermined time (about several milliseconds (ms)) from time t1 when the deceleration control was started (YES at step S3), the reference speed generator 24 generates a reference speed that decreases with the passage of time, based on the movement speed of the worktable 14 detected by the encoder 18 and the predetermined deceleration (step S4). Even if the abnormality detector 22 detects an abnormality of the encoder 18 and the motor controller 30 starts deceleration control of the servomotor 20, the movement speed of the worktable 14 does not decrease promptly. The above predetermined time may be set to a time from the start of the deceleration control of the servomotor 20 by the motor controller 30 until the movement speed of the worktable 14 certainly decreases. The predetermined time may be set variably depending on the command speed of the worktable 14. Further, the highest movement speed of the worktable 14 may be identified from among the movement speed of the worktable 14 detected by the encoder 18, and a reference speed that decreases with passage of time may be generated, based on the identified highest movement speed of the worktable 14 and the predetermined deceleration.

The predetermined deceleration used to generate the reference speed in the reference speed generator 24 may be set as appropriate based on the deceleration of the movement speed of the worktable 14 when deceleration control of the servomotor 20 is performed by the motor control device 10 under the condition where the encoder 18 is normal. Instead of the above-described predetermined deceleration, the deceleration of the movement speed of the worktable 14 detected by the encoder 18 at the time t2 when a predetermined time (about several milliseconds) elapses from the time t1 when the deceleration control was started, may be used.

At time t3, the speed monitor 26 determines that the absolute value of the movement speed of the worktable 14 detected by the encoder 18 has become equal to or greater than the reference speed (step S5: YES). At this time, the brake controller 28 outputs an operation command for actuating the dynamic brake 32 (step S6). The motor controller 30 stops deceleration control of the servomotor 20.

[Operation and Effect]

The motor controller 30 controls the servomotor 20 based on the movement speed of the worktable 14 detected by the encoder 18 so that the movement speed of the worktable 14 becomes equal to the command speed. When an abnormality occurs in the encoder 18, the motor controller 30 becomes unable to appropriately control the servomotor 20 so as to adjust the movement speed of the worktable 14 to the command speed. As such, the motor controller 30 performs deceleration control of the servomotor 20 and stops the axial movement of the worktable 14.

There are cases where, if an abnormality occurs in the encoder 18 temporarily, the encoder 18 returns to its normal state so that the movement speed of the worktable 14 can be detected correctly. In such a case, it is possible to shorten the stopping distance of the axial movement of the worktable 14 by decelerating the servomotor 20 in the motor control device 10 rather than by braking the worktable 14 by activating the dynamic brake 32. Therefore, in the motor control device 10 according to the present embodiment, the deceleration control of the servomotor 20 is performed based on the movement speed of the worktable 14 detected by the encoder 18, instead of immediately stopping the movement by means of the dynamic brake 32.

However, there is a risk that the servomotor 20 runs out of control if the motor control device 10 performs deceleration control of the servomotor 20 based on the movement speed of the worktable 14 detected by the encoder 18 that is seriously lowered in accuracy. To deal with this, in the present embodiment, when the speed monitor 26 determines that the absolute value of the movement speed of the worktable 14 detected by the encoder 18 is equal to or greater than the reference speed, the brake controller 28 actuates the dynamic brake 32. Thereby, it is possible to prevent runaway of the servomotor 20 and reliably stop the axial movement of the worktable 14.

Further, in the present embodiment, when the speed monitor 26 determines that the absolute value of the movement speed of the worktable 14 detected by the encoder 18 is equal to or greater than the reference speed, the deceleration control of the servomotor 20 by the motor controller 30 is stopped. With this configuration, it is possible to prevent runaway of the servomotor 20.

Further, in the present embodiment, the reference speed generator 24 generates a reference speed, based on the movement speed of the worktable 14 detected by the encoder 18 after a lapse of the predetermined time from when the abnormality detector 22 detected an abnormality of the encoder 18 and the predetermined deceleration. Thereby, the reference speed can be generated based on the movement speed of the worktable 14 after deceleration has been started.

In the present embodiment, the speed monitor 26 uses the absolute value of the movement speed of the worktable 14 detected by the encoder 18 to determine whether or not the absolute value of the movement speed is equal to or greater than the reference speed. Therefore, even if the worktable 14 moves in reverse (inverse rotation) during the deceleration control of the servomotor 20 by the motor controller 30, the speed monitor 26 can determine that the movement speed of the movement target object 15 is more than or equal to the reference speed.

In the present embodiment, when it is determined that the absolute value of the movement speed of the worktable 14 detected by the encoder 18 is equal to or greater than the reference speed, the servomotor 20 is stopped by the dynamic brake 32. Thus, the servomotor 20 can be stopped forcibly.

Second Embodiment

[Configuration of Motor Control Device]

Figure 4:
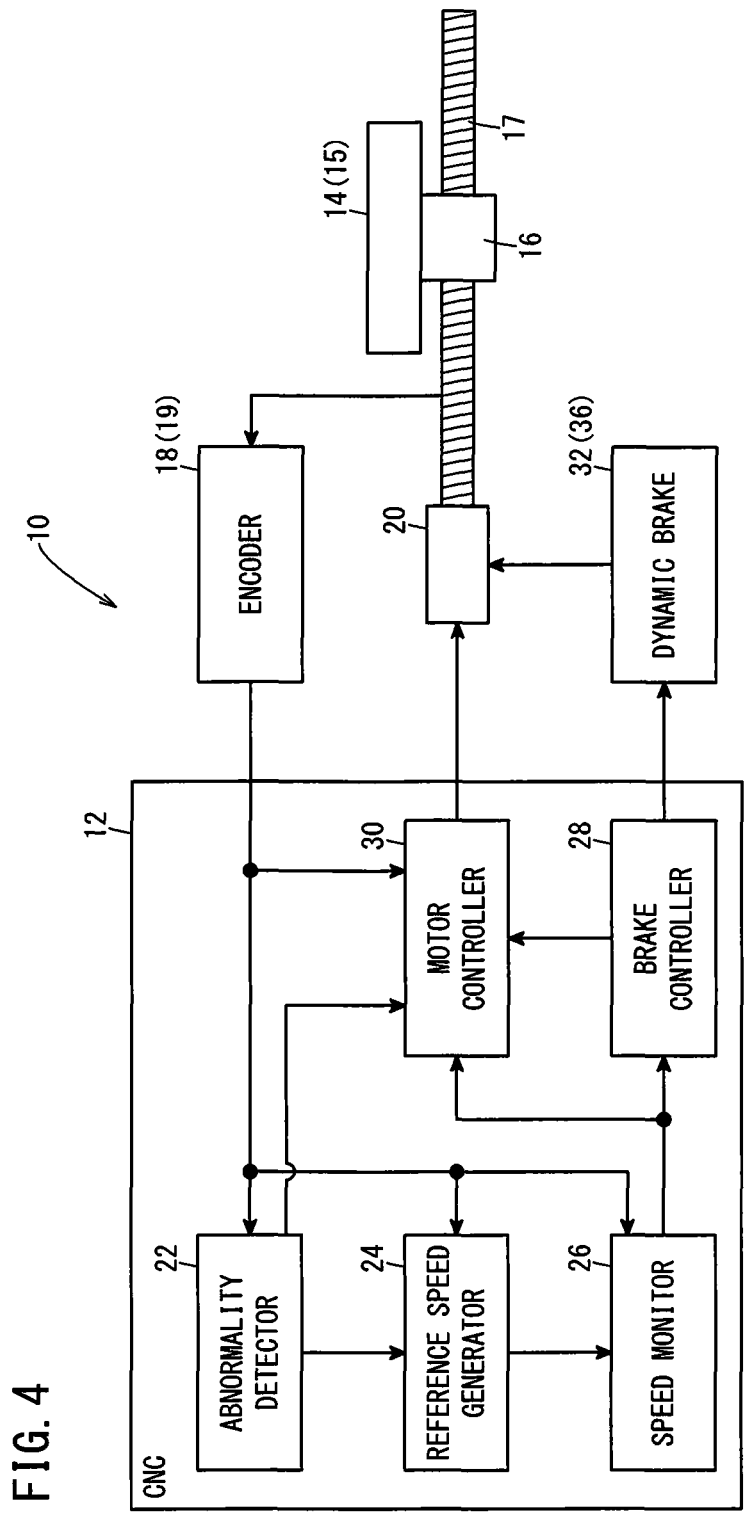
FIG. 4 is a block diagram showing the configuration of a motor control device.

Similarly to the first embodiment, the motor control device 10 of the present embodiment includes a CNC (computer numerical controller) 12 for controlling the machine tool and an encoder 18 for detecting the movement speed of the worktable 14 (rotational speed). FIG. 4 is a block diagram showing a configuration of the motor control device 10. The CNC 12 includes a motor controller 30, an abnormality detector 22, a reference speed generator 24, a brake controller 28 and a speed monitor 26. The abnormality detector 22 and the reference speed generator 24 are the same as those of the first embodiment.

The speed monitor 26 monitors whether or not the absolute value of the movement speed of the worktable 14 detected by the encoder 18 is equal to or greater than the reference speed. The speed monitor 26 also monitors whether or not variation in the movement speed of the worktable 14 is within a predetermined speed range.

When the speed monitor 26 determines that the absolute value of the movement speed of the worktable 14 detected by the encoder 18 is less than the reference speed, the brake controller 28 determines whether or not variation in the movement speed of the worktable 14 continues staying within the predetermined speed range for a predetermined time. When determining that the variation in the movement speed of the worktable 14 has continued staying within the predetermined speed range for the predetermined time, the brake controller 28 activates the dynamic brake 32 to brake the axial movement of the worktable 14.

The motor controller 30 controls the electric power to be supplied to the servomotor 20, based on the command speed which is the command value of the movement speed of the worktable 14 and the movement speed of the worktable 14 detected by the encoder 18. Further, when an abnormality of the encoder 18 is detected by the abnormality detector 22, the motor controller 30 performs deceleration control on the servomotor 20 to decelerate the axial movement of the worktable 14. Further, when the speed monitor 26 determines that the absolute value of the movement speed of the worktable 14 detected by the encoder 18 is less than the reference speed, and when the brake controller 28 determines that the variation in the movement speed of the worktable 14 has continued staying within the predetermined speed range for the predetermined time, the motor controller 30 stops deceleration control of the servomotor 20.

[Worktable Stop Control Process]

Figure 5:
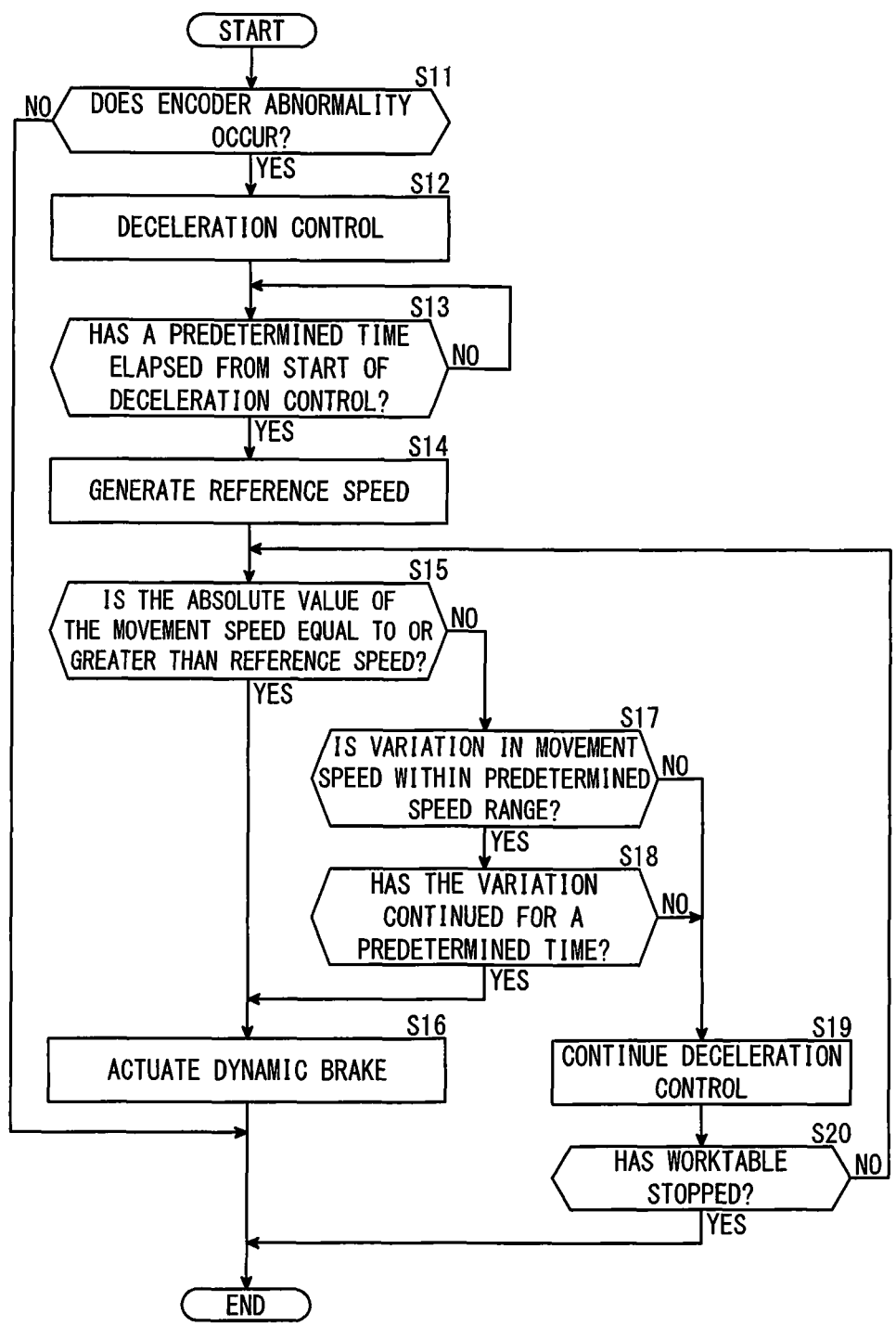
FIG. 5 is a flowchart showing a flow of how the motor control device performs a stop control process on a movement target object.

In the motor control device 10 of the present embodiment, when an abnormality occurs in the encoder 18, stop control is performed to stop the worktable 14. FIG. 5 is a flowchart showing a flow of how the motor control device 10 performs a stop control process of the movement target object 15.

At step S11, the abnormality detector 22 determines whether or not an abnormality of the encoder 18 is detected. When an abnormality of the encoder 18 is detected, the process proceeds to step S12. When no abnormality of the encoder 18 is detected, the process is terminated.

At step S12, the motor controller 30 performs deceleration control to decelerate the servomotor 20 based on the movement speed of the worktable 14 detected by the encoder 18, and the process proceeds to step S13.

At step S13, the reference speed generator 24 determines whether or not a predetermined time has elapsed since the motor controller 30 started deceleration control of the servomotor 20. When a predetermined time has elapsed since the start of deceleration control of the servomotor 20, the process proceeds to step S14. When the predetermined time has not elapsed since the deceleration control of the servomotor 20 was started, the procedure at step S13 is repeated.

At step S14, the reference speed generator 24 generates a reference speed and the process proceeds to step S15. The reference speed generator 24 generates a reference speed that lowers with the passage of time, based on the movement speed of the worktable 14 detected by the encoder 18 when the predetermined time has elapsed since the motor controller 30 started the deceleration control of the servomotor 20 and a predetermined deceleration.

At step S15, the speed monitor 26 determines whether or not the absolute value of the movement speed of the worktable 14 is equal to or greater than the reference speed. When the absolute value of the movement speed of the worktable 14 is equal to or greater than the reference speed, the process proceeds to step S16. When the absolute value of the movement speed of the worktable 14 is less than the reference speed, the process goes to step S17.

At step S16, the brake controller 28 outputs an operation command for actuating the dynamic brake 32, and ends the process. At this time, the motor controller 30 stops deceleration control of the servomotor 20.

At step S17 following the negative decision at step S15, the speed monitor 26 determines whether or not the variation in the movement speed of the worktable 14 is within the predetermined speed range. When the variation in the movement speed of the worktable 14 is within the predetermined speed range, the process proceeds to step S18. When the variation in the movement speed of the worktable 14 is not within the predetermined speed range, the process proceeds to step S19.

At step S18, the brake controller 28 determines whether or not the variation in the movement speed of the worktable 14 has continued staying within the predetermined speed range for a predetermined time (a predetermined time). When the variation in the movement speed of the worktable 14 has continued staying within the predetermined speed range for the predetermined time, the process goes to step S16. When the variation in the movement speed of the worktable 14 has not continued staying within the predetermined speed range for the predetermined time, the process goes to step S19.

At step S19 following the negative decision at step S17 or step S18, the motor controller 30 continues deceleration control on the servomotor 20, then the process goes to step S20. At this time, the brake controller 28 does not output an operation command to the dynamic brake 32.

At step S20, the motor controller 30 determines whether or not the worktable 14 has stopped, based on the movement speed of the worktable 14 detected by the encoder 18. When the worktable 14 is stopped, the process is terminated. When the worktable 14 is not stopped, the process returns to the step S15.

It is noted that, after the affirmative decision at step S17, the process may skip step S18 and directly proceed to step S16.

Figure 6:
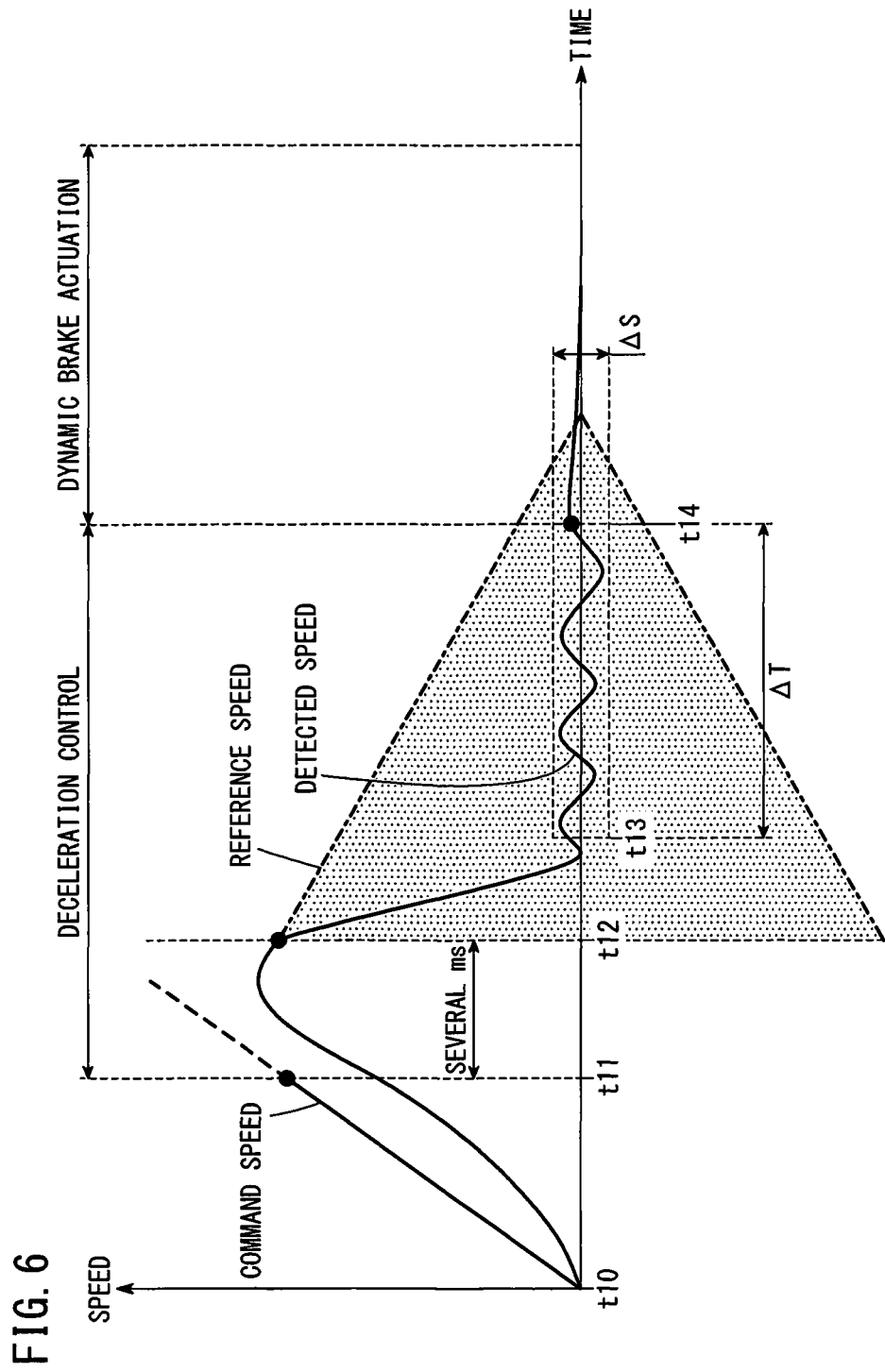
FIG. 6 is a time chart showing the movement speed of a worktable detected by an encoder when a stop control of the worktable is performed in the motor control device.

FIG. 6 is a time chart showing the movement speed (indicated as detected speed in FIG. 6) of the worktable 14 detected by the encoder 18 when a stop control of the worktable 14 is performed in the motor control device 10. From time t10 to time t11, the motor controller 30 controls the servomotor 20 so that the movement speed of the worktable 14 becomes equal to the command speed, based on the movement speed of the worktable 14 detected by the encoder 18.

At time t11, the abnormality detector 22 detects an abnormality of the encoder 18 (step S11: YES). After time t11, the motor controller 30 performs deceleration control on the servomotor 20 based on the movement speed of the worktable 14 detected by the encoder 18 (step S12).

At time t12 after a lapse of a predetermined time (about several milliseconds) from time t11 when the deceleration control was started (YES at step S13), the reference speed generator 24 generates a reference speed that decreases with the passage of time, based on the movement speed of the worktable 14 detected by the encoder 18 and the predetermined deceleration (step S14).

At time t13, the speed monitor 26 determines that the absolute value of the movement speed of the worktable 14 detected by the encoder 18 is less than the reference speed (step S15: NO). The speed monitor 26 further determines that the variation in the movement speed of the worktable 14 detected by the encoder 18 is within a predetermined speed range ΔS (step S17: YES). At the time t14 after a lapse of a predetermined time ΔT from the time t13, the brake controller 28 determines that the variation in the movement speed of the worktable 14 detected by the encoder 18 has continued staying within the predetermined speed range for the predetermined time (step S18: YES). At this time, the brake controller 28 outputs an operation command for activating the dynamic brake 32. The motor controller 30 stops deceleration control of the servomotor 20.

[Operation and Effect]

In the motor control device 10 of the present embodiment, when the speed monitor 26 determines that the absolute value of the movement speed of the worktable 14 detected by the encoder 18 is less than the reference speed, and determines that the variation of the movement speed of the worktable 14 detected by the encoder 18 is within the predetermined speed range, the brake controller 28 actuates the dynamic brake 32.

When the variation of the movement speed of the worktable 14 detected by the encoder 18 falls within the predetermined speed range despite the deceleration control of the servomotor 20 performed by the motor control device 10, it is conceivable that the detection accuracy of the movement speed of the worktable 14 by the encoder 18 is lowered. In such a case, if the motor controller 30 continues deceleration control on the servomotor 20, there is a risk that the servomotor 20 runs out of control. In the motor control device 10 of the present embodiment, the dynamic brake 32 is actuated so as to be able to reliably stop the axial movement of the worktable 14.

Further, in the motor control device 10 of the present embodiment, when the speed monitor 26 determines that the absolute value of the movement speed of the worktable 14 detected by the encoder 18 is less than the reference speed, and that the variation of the movement speed of the worktable 14 detected by the encoder 18 is within the predetermined speed range, and when the variation of the movement speed of the worktable 14 has continued staying within the predetermined speed range for the predetermined time (the predetermined time), the brake controller 28 actuates the dynamic brake 32.

There are cases that an abnormality has already occurred in the encoder 18 when the deceleration control of the servomotor 20 is being performed in the motor controller 30, and temporarily the encoder 18 cannot stably detect the movement speed of the worktable 14. In the motor control device 10 according to the present embodiment, when the detection of the movement speed of the worktable 14 by the encoder 18 has become temporarily unstable, the motor controller 30 continues the deceleration control of the servomotor 20. On the other hand, when such an unstable detection of the movement speed of the worktable 14 by the encoder 18 continues, the motor control device 10 of the present embodiment actuates the dynamic brake 32 to thereby positively stop the axial movement of the worktable 14.

Third Embodiment

A motor control device 10 according to the third embodiment has the same configuration as the motor control device 10 of the first embodiment, except that the stop control of the worktable 14 is partially different from that of the first embodiment.

[Worktable Stop Control Process]

Figure 7:
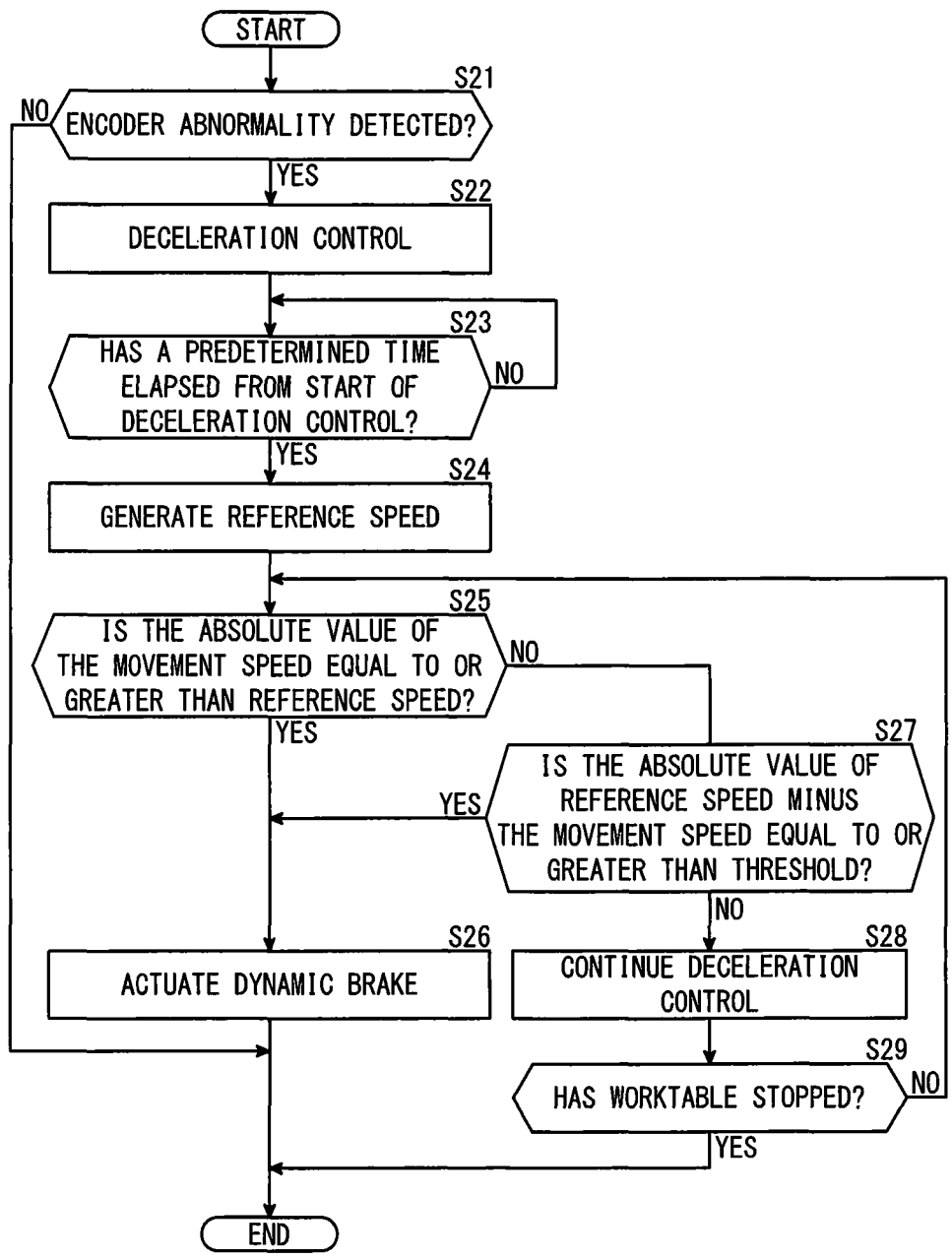
FIG. 7 is a flowchart showing a flow of how a motor control device performs a stop control process on a movement target object.

In the motor control device 10 of the present embodiment, when an abnormality occurs in the encoder 18, stop control is performed to stop the worktable 14. FIG. 7 is a flowchart showing the flow of how the motor control device 10 performs a control process of stopping the movement target object 15.

At step S21, the abnormality detector 22 determines whether or not an abnormality of the encoder 18 is detected. When an abnormality of the encoder 18 is detected, the process proceeds to step S22. When no error of the encoder 18 is detected, the process is terminated. At step S22, the motor controller 30 performs deceleration control to decelerate the servomotor 20 based on the movement speed of the worktable 14 detected by the encoder 18, and the process proceeds to step S23.

At step S23, the reference speed generator 24 determines whether or not a predetermined time has elapsed since the motor controller 30 started deceleration control of the servomotor 20. When a predetermined time has elapsed since the start of deceleration control of the servomotor 20, the process proceeds to step S24. When the predetermined time has not elapsed since the start of deceleration control of the servomotor 20, the procedure at step S23 is repeated.

At step S24, the reference speed generator 24 generates a reference speed and the process proceeds to step S25. The reference speed generator 24 generates a reference speed that lowers with the passage of time, based on the movement speed of the worktable 14 detected by the encoder 18 when the predetermined time has elapsed since the motor controller 30 started the deceleration control of the servomotor 20 and a predetermined deceleration.

At step S25, the speed monitor 26 determines whether or not the absolute value of the movement speed of the worktable 14 is equal to or greater than the reference speed. When the absolute value of the movement speed of the worktable 14 is equal to or greater than the reference speed, the process proceeds to step S26. When the absolute value of the movement speed of the worktable 14 is less than the reference speed, the process goes to step S27.

At step S26, the brake controller 28 outputs an operation command for actuating the dynamic brake 32, and the process is put to an end. At this time, the motor controller 30 stops deceleration control of the servomotor 20.

At step S27, the speed monitor 26 determines whether the absolute value of a value obtained by subtracting the movement speed of the worktable 14 from the reference speed is equal to or greater than a threshold. When the absolute value of the value obtained by subtracting the movement speed of the worktable 14 from the reference speed is equal to or greater than the threshold, the process goes to step S26. When the absolute value of the value obtained by subtracting the movement speed of the worktable 14 from the reference speed is less than the threshold, the process goes to step S28.

At step S28, the motor controller 30 continues deceleration control on the servomotor 20, then the process goes to step S29. At this time, the brake controller 28 does not output an operation command to the dynamic brake 32.

At step S29, the motor controller 30 determines whether or not the worktable 14 has stopped, based on the movement speed of the worktable 14 detected by the encoder 18. When the worktable 14 is stopped, the process is terminated. When the worktable 14 is not stopped, the process returns to the step S25.

Figure 8:
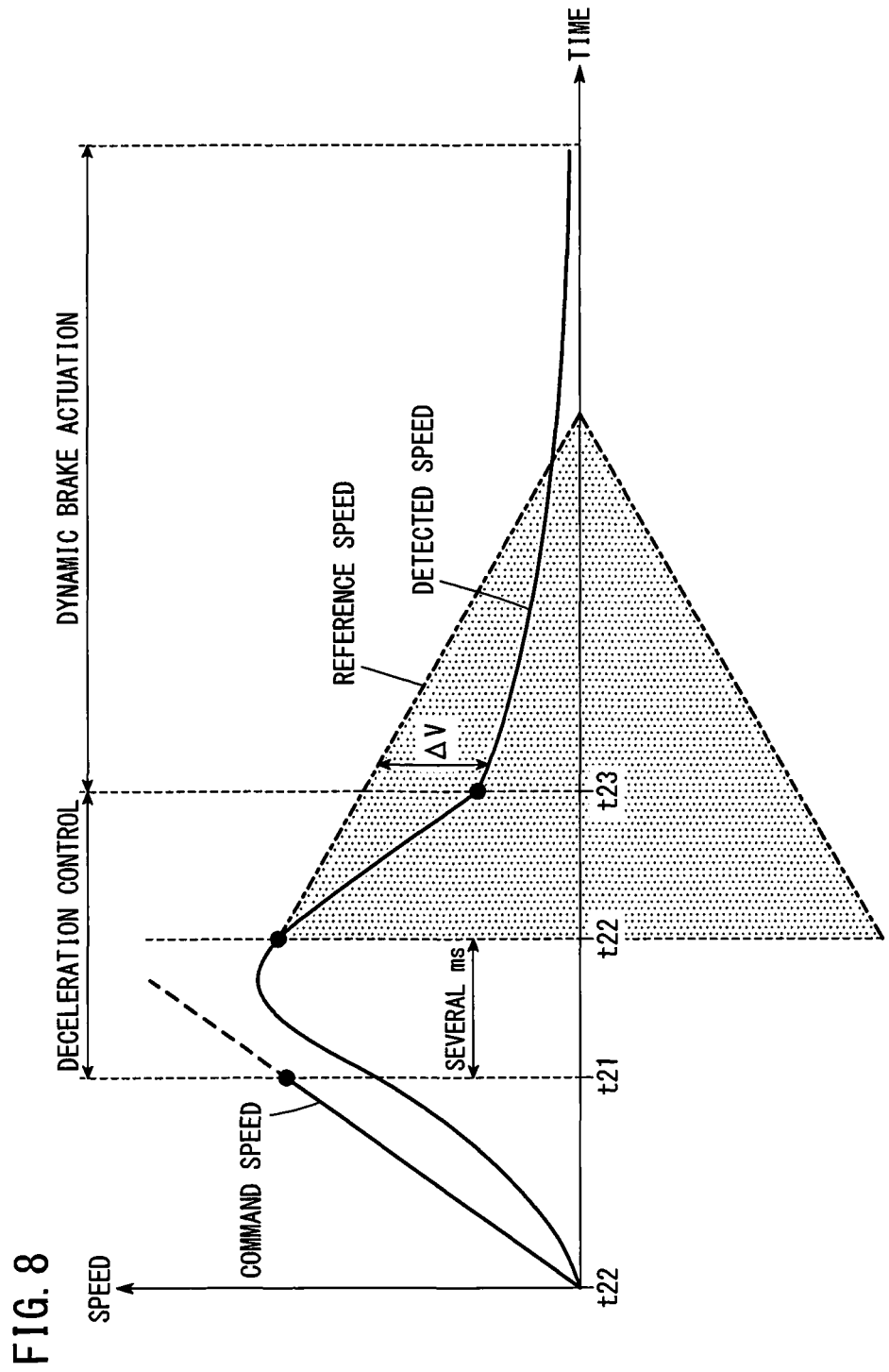
FIG. 8 is a time chart showing the movement speed of a worktable detected by an encoder when a stop control of the worktable is performed in a motor control device.

FIG. 8 is a time chart showing the movement speed (indicated as detected speed in FIG. 8) of the worktable 14 detected by the encoder 18 when a stop control of the worktable 14 is performed in the motor control device 10. From time t20 to time t21, the motor controller 30 controls the servomotor 20 so that the movement speed of the worktable 14 becomes equal to the command speed, based on the movement speed of the worktable 14 detected by the encoder 18.

At time t21, the abnormality detector 22 detects an abnormality of the encoder 18 (step S21: YES). After time t21, the motor controller 30 performs deceleration control on the servomotor 20 based on the movement speed of the worktable 14 detected by the encoder 18 (step S22).

At time t22 after a lapse of a predetermined time (about several milliseconds) from time t21 when the deceleration control was started (YES at step S23), the reference speed generator 24 generates a reference speed that decreases with the passage of time, based on the movement speed of the worktable 14 detected by the encoder 18 and the predetermined deceleration (step S24).

At time t23, the speed monitor 26 determines that the absolute value of the movement speed of the worktable 14 detected by the encoder 18 is less than the specified speed (step S25: NO). The speed monitor 26 further determines that the absolute value of the value obtained by subtracting the movement speed of the worktable 14 from the reference speed is equal to or greater than a threshold $\Delta V$ (step S27: YES). At this time, the brake controller 28 outputs an operation command for actuating the dynamic brake 32 to thereby actuate the dynamic brake 32 (step S26). Further, the motor controller 30 stops deceleration control of the servomotor 20.

[Operation and Effect]

In the motor control device 10 of the present embodiment, when the speed monitor 26 determines that the absolute value of the movement speed of the worktable 14 detected by the encoder 18 is less than the reference speed, and when the absolute value of the value obtained by subtracting the reference speed from the movement speed of the worktable 14 detected by the encoder 18 is equal to or greater than the threshold, the brake controller 28 actuates the dynamic brake 32.

When the absolute value of the value obtained by subtracting, from the reference speed, the movement speed of the worktable 14 detected by the encoder 18 becomes greater than the threshold despite the deceleration control of the servomotor 20 being performed by the motor control device 10, it is conceivable that the detection accuracy of the movement speed of the worktable 14 by the encoder 18 is lowered. In such a case, if the motor controller 30 continues deceleration control on the servomotor 20, there is a risk that the servomotor 20 runs out of control. In the motor control device 10 of the present embodiment, the dynamic brake 32 is actuated so as to be able to reliably stop the axial movement of the worktable 14.

[Modification]

Figure 9:
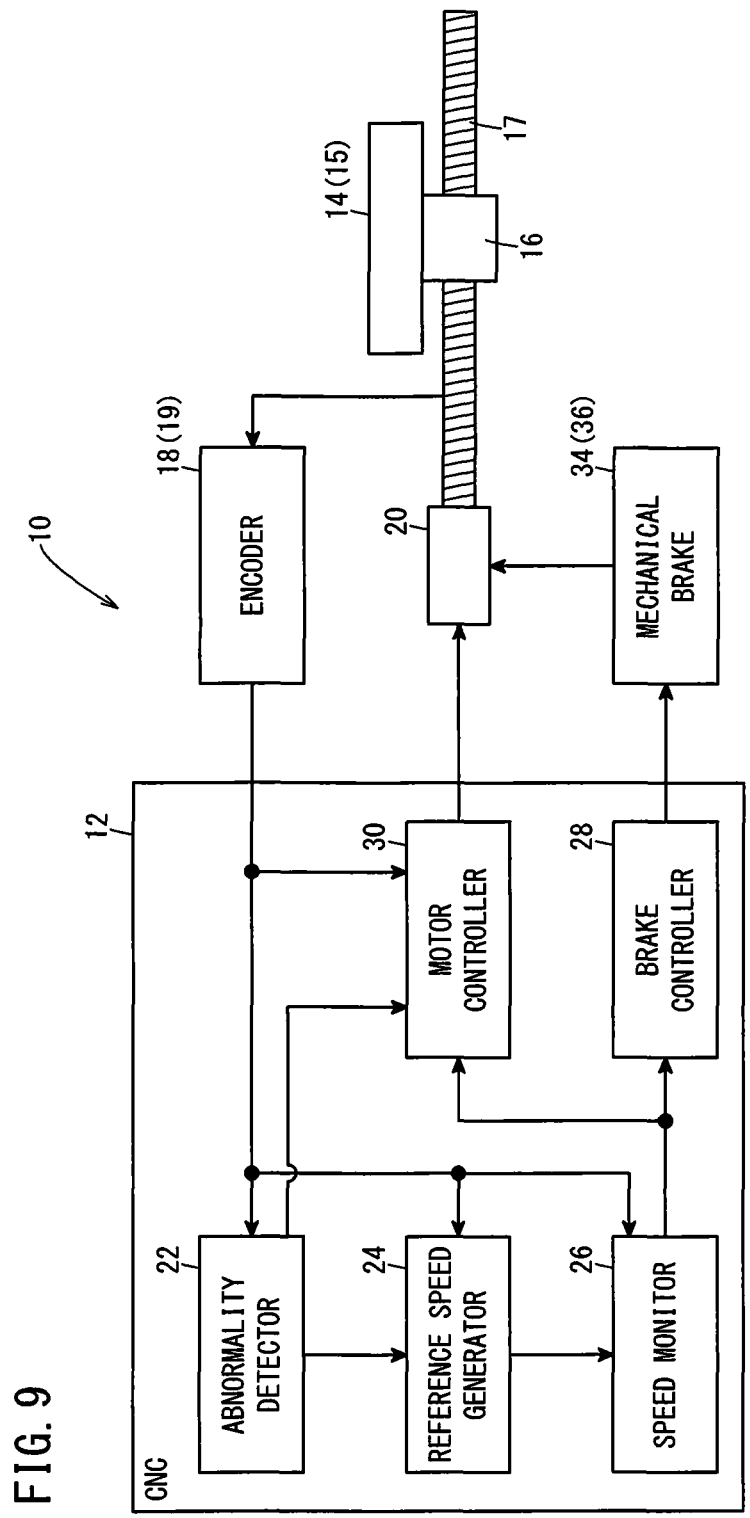
FIG. 9 is a block diagram showing a configuration of a motor control device.

FIG. 9 is a block diagram showing a configuration of a motor control device 10. As shown in FIG. 9, in place of the dynamic brake 32 used in the above first to third embodiments, a mechanical brake 34 for braking the worktable 14 by restraining the rotation of the rotating shaft of the servomotor 20, may be used. Here, this mechanical brake 34 forms the brake 36.

[Technical Ideas Obtained from Embodiment]

Technical ideas that can be grasped from the above embodiment will be described below.

The motor control device (10) for controlling a servomotor (20) so as to axially move a movement target object (15), includes: a speed detector (19) configured to detect the movement speed of the movement target object (15); an abnormality detector (22) configured to detect an abnormality of the speed detector (19); a motor controller (30) configured to perform deceleration control on the servomotor (20) to decelerate the movement target object (15), upon detection of the abnormality; a reference speed generator (24) configured to generate a reference speed that decreases with passage of time, based on the movement speed when the movement target object (15) decelerates and a predetermined deceleration; a speed monitor (26) configured to monitor the movement speed and determine whether or not the movement speed is equal to or greater than the reference speed; and a brake controller (28) configured to actuate a brake (36) for braking axial movement of the movement target object (15), when the movement speed is determined to be equal to or greater than the reference speed. This configuration makes it possible to prevent runaway of the servomotor (20) and reliably stop the axial movement of the movement target object (15).

In the above motor control device (10), the motor controller (30) may be configured to stop the deceleration control of the servomotor (20) when the movement speed is determined to be equal to or greater than the reference speed. As a result, it is possible to prevent runaway of the servomotor (20).

In the above motor control device (10), the reference speed generator (24) may be configured to generate the reference speed based on the movement speed after a lapse of a predetermined time from detection of the abnormality and the predetermined deceleration. Thereby, it is possible to generate a reference speed based on the movement speed of the movement target object (15) after starting deceleration.

In the above motor control device (10), the speed monitor (26) may be configured to further determine whether or not variation in the movement speed is within a predetermined range, and the brake controller (28) may be configured to actuate the brake (36) in a case where the variation in the movement speed is determined to be within a predetermined range even if it is determined that the movement speed is lower than the reference speed. This makes it possible to actuate the brake (36) so as to reliably stop the axial movement of the movement target object (15).

In the above motor control device (10), the brake controller (28) may be configured to actuate the brake (36) when it is determined that the variation in the movement speed has continued staying within a predetermined speed range for a predetermined time. As a result, when the detection of the movement speed of the movement target object (15) by the speed detector (19) has been continuously unstable, the brake (36) is actuated so as to be able to reliably stop the axial movement of the movement target object (15).

In the above motor control device (10), the speed monitor (26) may be configured to further determine whether or not the absolute value of a value obtained by subtracting the movement speed from the reference speed is equal to or greater than a threshold, and the brake controller (28) may be configured to actuate the brake (36) in a case where the absolute value of the value obtained by subtracting the movement speed from the reference speed is equal to or greater than the threshold even if it is determined that the movement speed is lower than the reference speed. This makes it possible to actuate the brake (36) to reliably stop the axial movement of the movement target object (15).

In the above motor control device (10), the speed monitor (26) may be configured to make a determination by using the absolute value of the movement speed. Even if the movement target object (15) rotates in reverse during the deceleration control of the servomotor (20) by the motor controller (30), the speed monitor (26) can determine that the movement speed of the movement target object (15) becomes equal to or greater than the reference speed.

In the above motor control device (10), the brake (36) may be a dynamic brake (32) or a mechanical brake (34). Thereby, it is possible to stop the servomotor (20) forcibly.

In a control method for a motor control device (10) that controls a servomotor (20) so as to axially move a movement target object (15), the motor control device (10) includes a speed detector (19) configured to detect the movement speed of the movement target object (15), and the method includes: a speed detecting step of detecting the movement speed of the movement target object (15) by the speed detector (19); an abnormality detecting step of detecting an abnormality of the speed detector (19); a motor controlling step of performing deceleration control on the servomotor (20) to decelerate the movement target object (15) upon detection of the abnormality; a reference speed generating step of generating a reference speed that decreases with the passage of time, based on the movement speed when the movement target object (15) decelerates and a predetermined deceleration; a speed monitoring step of monitoring the movement speed and determining whether or not the movement speed is equal to or greater than the reference speed; and a brake controlling step of actuating a brake (36) for braking the axial movement of the movement target object (15), when the movement speed is determined to be equal to or greater than the reference speed. This configuration makes it possible to prevent runaway of the servomotor (20) and reliably stop the axial movement of the movement target object (15).

In the above control method for the motor control device (10), the motor control step may stop the deceleration control of the servomotor (20) when the movement speed is determined to be equal to or greater than the reference speed. As a result, it is possible to prevent runaway of the servomotor (20).

In the above control method for the motor control device (10), the reference speed generating step may generate the reference speed based on the movement speed after a lapse of a predetermined time from detection of the abnormality and the predetermined deceleration. Thereby, it is possible to generate a reference speed based on the movement speed of the movement target object (15) after starting deceleration.

In the above control method for the motor control device (10), the speed monitoring step may further determine whether or not the variation in the movement speed is within a predetermined range, and the brake control step may actuate the brake (36) in a case where the variation in the movement speed is determined to be within a predetermined range even if it is determined that the movement speed is lower than the reference speed. This makes it possible to actuate the brake (36) so as to reliably stop the axial movement of the movement target object (15).

In the above control method for the motor control device (10), the brake controlling step may actuate the brake (36) when it is determined that the variation in the movement speed has continued staying within a predetermined speed range for a predetermined time. As a result, when the detection of the movement speed of the movement target object (15) by the speed detector (19) has been continuously unstable, the brake (36) is actuated so as to be able to reliably stop the axial movement of the movement target object (15).

In the above control method for the motor control device (10), the speed monitoring step may further determine whether or not the absolute value of a value obtained by subtracting the movement speed from the reference speed is equal to or greater than a threshold, and the brake controlling step may actuate the brake (36) in a case where the absolute value of the value obtained by subtracting the movement speed from the reference speed is equal to or greater than the threshold even if it is determined that the movement speed is lower than the reference speed. This makes it possible to actuate the brake (36) to reliably stop the axial movement of the movement target object (15).

In the above control method for the motor control device (10), the speed monitoring step may make a determination by using the absolute value of the movement speed. Even if the movement target object (15) rotates in reverse during the deceleration control of the servomotor (20) by the motor controller (30), the speed monitor (26) can determine that the movement speed of the movement target object (15) becomes equal to or greater than the reference speed.

While the invention has been particularly shown and described with reference to the preferred embodiments, it will be understood that variations and modifications can be effected thereto by those skilled in the art without departing from the scope of the invention as defined by the appended claims.

What is claimed is:

1. A motor control device for controlling a servomotor so as to axially move a movement target object, comprising:
    a speed detector configured to detect a movement speed of the movement target object;
    an abnormality detector configured to detect an abnormality of the speed detector;
    a motor controller configured to perform deceleration control on the servomotor to decelerate the movement target object, upon detection of the abnormality;
    a reference speed generator configured to generate a reference speed that decreases with passage of time, based on the movement speed when the movement target object decelerates and a predetermined deceleration;
    a speed monitor configured to monitor the movement speed and determine whether or not the movement speed is equal to or greater than the reference speed, wherein the speed monitor is configured to make a determination by using an absolute value of the movement speed; and
    a brake controller configured to actuate a brake for braking axial movement of the movement target object, when the movement speed is determined to be equal to or greater than the reference speed, wherein:
        the speed monitor is further configured to determine whether or not an absolute value of a value obtained by subtracting the movement speed from the reference speed is equal to or greater than a threshold; and
        the brake controller is configured to actuate the brake in a case where the absolute value of the value obtained by subtracting the movement speed from the reference speed is equal to or greater than the threshold even if it is determined that the movement speed is lower than the reference speed, wherein the motor controller is configured to stop the deceleration control of the servomotor when the movement speed is determined to be equal to or greater than the reference speed.

2. The motor control device according to claim 1, wherein the reference speed generator is configured to generate the reference speed based on the movement speed after a lapse of a predetermined time from detection of the abnormality and the predetermined deceleration.

3. The motor control device according to claim 1, wherein:

the speed monitor is configured to further determine whether or not variation in the movement speed is within a predetermined range; and the brake controller is configured to actuate the brake in a case where the variation in the movement speed is determined to be within a predetermined range even if it is determined that the movement speed is lower than the reference speed.

4. The motor control device according to claim 3, wherein the brake controller is configured to actuate the brake when it is determined that the variation in the movement speed has continued staying within a predetermined speed range for a predetermined time.

5. The motor control device according to claim 1, wherein the brake is a dynamic brake or a mechanical brake.

6. A control method for a motor control device that controls a servomotor so as to axially move a movement target object, wherein the motor control device includes a speed detector configured to detect a movement speed of the movement target object, comprising:
   a speed detecting step of detecting the movement speed of the movement target object by the speed detector;
   an abnormality detecting step of detecting an abnormality of the speed detector;
   a motor controlling step of performing deceleration control on the servomotor to decelerate the movement target object upon detection of the abnormality;
   a reference speed generating step of generating a reference speed that decreases with passage of time, based on the movement speed when the movement target object decelerates and a predetermined deceleration;
   a speed monitoring step of monitoring the movement speed and determining whether or not the movement speed is equal to or greater than the reference speed, wherein the speed monitoring step makes a determination by using an absolute value of the movement speed; and
   a brake controlling step of actuating a brake for braking axial movement of the movement target object, when the movement speed is determined to be equal to or greater than the reference speed, wherein:
   the speed monitoring step further determines whether or not an absolute value of a value obtained by subtracting the movement speed from the reference speed is equal to or greater than a threshold; and
   the brake controlling step actuates the brake in a case where the absolute value of the value obtained by subtracting the movement speed from the reference speed is equal to or greater than the threshold even if it is determined that the movement speed is lower than the reference speed, wherein the motor controlling step stops the deceleration control of the servomotor when the movement speed is determined to be equal to or greater than the reference speed.

7. The control method for the motor control device according to claim 6, wherein the reference speed generating step generates the reference speed based on the movement speed after a lapse of a predetermined time from detection of the abnormality and the predetermined deceleration.

8. The control method for the motor control device according to claim 6, wherein:
   the speed monitoring step further determines whether or not variation in the movement speed is within a predetermined range; and
   the brake control step actuates the brake in a case where the variation in the movement speed is determined to be within a predetermined range even if it is determined that the movement speed is lower than the reference speed.

9. The control method for the motor control device according to claim 8, wherein the brake controlling step actuates the brake when it is determined that the variation in the movement speed has continued staying within a predetermined speed range for a predetermined time.

* * * * *